United States Patent
Bardale

(10) Patent No.: US 9,442,806 B1
(45) Date of Patent: Sep. 13, 2016

(54) BLOCK-LEVEL DEDUPLICATION

(75) Inventor: Trimbak Somnathappa Bardale, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 171 days.

(21) Appl. No.: 12/957,371

(22) Filed: Nov. 30, 2010

(51) Int. Cl.
*G06F 17/30* (2006.01)
*G06F 11/14* (2006.01)

(52) U.S. Cl.
CPC ....... *G06F 11/1453* (2013.01); *G06F 11/1464* (2013.01)

(58) Field of Classification Search
CPC .......................... G06F 3/0641; G06F 11/1464
USPC .................................. 707/644, 646
See application file for complete search history.

(56) References Cited

U.S. PATENT DOCUMENTS

| | | | |
|---|---|---|---|
| 6,467,021 B1 | 10/2002 | Sinclair | |
| 6,751,674 B1 * | 6/2004 | Satagopan | H04L 29/06 707/999.202 |
| 7,472,242 B1 | 12/2008 | Deshmukh et al. | |
| 7,657,578 B1 * | 2/2010 | Karr | G06F 11/2069 707/610 |
| 8,204,868 B1 * | 6/2012 | Wu et al. | 707/693 |
| 8,650,162 B1 | 2/2014 | Vaikar et al. | |
| 2008/0013830 A1 | 1/2008 | Patterson et al. | |
| 2008/0256143 A1 | 10/2008 | Reddy et al. | |
| 2009/0049260 A1 | 2/2009 | Upadhyayula | |
| 2009/0132616 A1 | 5/2009 | Winter et al. | |
| 2010/0031086 A1 | 2/2010 | Leppard | |
| 2010/0114833 A1 * | 5/2010 | Mu | 707/650 |
| 2010/0125553 A1 | 5/2010 | Huang et al. | |
| 2010/0250858 A1 * | 9/2010 | Cremelie et al. | 711/136 |
| 2011/0016095 A1 * | 1/2011 | Anglin et al. | 707/692 |
| 2011/0099351 A1 * | 4/2011 | Condict | 711/216 |
| 2011/0161723 A1 * | 6/2011 | Taleck et al. | 714/4.11 |
| 2011/0196822 A1 * | 8/2011 | Zunger et al. | 707/609 |

OTHER PUBLICATIONS

Waterhouse, Scott, "The Backup Blog: Deduplication Calculator," May 8, 2008. Downloaded from website http://thebackupblog.typepad.com/thebackupblog/2008/05/deduplication-c.html on Jun. 29, 2009.
Crump, George, "Storage Channel Tips: Backup Window Reduction Methods," Jul. 11, 2008. Downloaded from web site http://searchstoragechannel.techtarget.com/tip/0,289483,sid98_gci1320964,00.html on Jun. 29, 2009.

(Continued)

*Primary Examiner* — Khaled Kassim
*Assistant Examiner* — Zhaohui Yang
(74) *Attorney, Agent, or Firm* — Campbell Stephenson LLP

(57) ABSTRACT

Various systems and methods can perform block-level deduplication. For example, one method involves sending a chunk of data to a deduplication server for storage in a deduplicated data store. The chunk of data includes multiple blocks. Subsequent to sending the chunk of data to the deduplication server, the method detects that at least one of the blocks has been modified. In response, the method sends associated information as well as the modified blocks, which include at least one but fewer than all of the blocks in the chunk, to the deduplication server. The associated information identifies a location of the included blocks within the chunk of data. The method can be performed by a computing device implementing a deduplication client.

15 Claims, 4 Drawing Sheets

| Old FP 250 | New FP 252 | Gran. 254 | Bitmap 256 | Modified Block(s) 258 |
|---|---|---|---|---|

(56) References Cited

OTHER PUBLICATIONS

"Fast, Efficient Online Backups," Copyright 1999-2008 Remote Data Backups, Inc. Downloaded from website http://www.remotedatabackups.com/features/fast-online-backups.htm on Jun. 29, 2009.

"Managed Backup and Recovery," Copyright 2008 LightEdge Solutions, Inc. Downloaded from website http://www.lightedge.com/producsservices/it/backupandrecovery.html on Jun. 29, 2009.

\* cited by examiner

BLOCK-LEVEL DEDUPLICATION

FIELD OF THE INVENTION

This invention relates to data deduplication and, more particularly, to performing block-level deduplication.

DESCRIPTION OF THE RELATED ART

Deduplication involves ensuring that each identical data item (e.g., each file or each fixed-size set data) is only stored once within a deduplicated data storage device. Unfortunately, the granularity used for data deduplication often differs from the granularity used for other optimizations within storage systems. For example, data deduplication is often performed on fixed-size "chunks" of data, and the size of these chunks often differs from the block size upon which volume operations are typically performed. This discrepancy often makes it difficult to integrate deduplication with other storage optimization operations.

SUMMARY OF THE INVENTION

Various systems and methods for performing block-level deduplication are disclosed. For example, one method involves sending a chunk of data to a deduplication server for storage in a deduplicated data store. The chunk of data includes multiple blocks. Subsequent to sending the chunk of data to the deduplication server, the method detects that at least one of the blocks has been modified. In response, the method sends associated information as well as the modified blocks, which include at least one but fewer than all of the blocks in the chunk, to the deduplication server. The associated information identifies a location of the included blocks within the chunk of data. The method can be performed by a computing device implementing a deduplication client.

In some embodiments, the chunk of data can be sent to the deduplication server via a network. In some embodiments, the associated information includes an identifier of a first version of the chunk of a data and an identifier of a second version of the chunk of data. The second version is created subsequent to the sending the chunk of data in response to the at least one of the plurality of blocks being modified. The associated information and at least one block can be sent in response to detecting that the second version of the chunk of data is not yet included in the deduplicated data store.

Another method can involve storing a first version of a chunk of data in a deduplicated data store. The chunk of data comprises a plurality of blocks. The method then receives a packet from a deduplication client. The packet includes associated information and a new value of at least one but fewer than all of the blocks. The associated information identifies a location of the included block(s). The method then updates the deduplicated data store, in response to receiving the packet. The method can be performed by a computing device implementing a deduplication server.

In one embodiment, updating the deduplicated data store can involve storing the new value of at least one but fewer than all of the blocks in the deduplicated data store and associating a reference with the new value, where the reference identifies the first version of the chunk of data. In one embodiment, the associating is performed in response to determining that an existing number of references for the chunk of data is less than a maximum allowed number of references.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
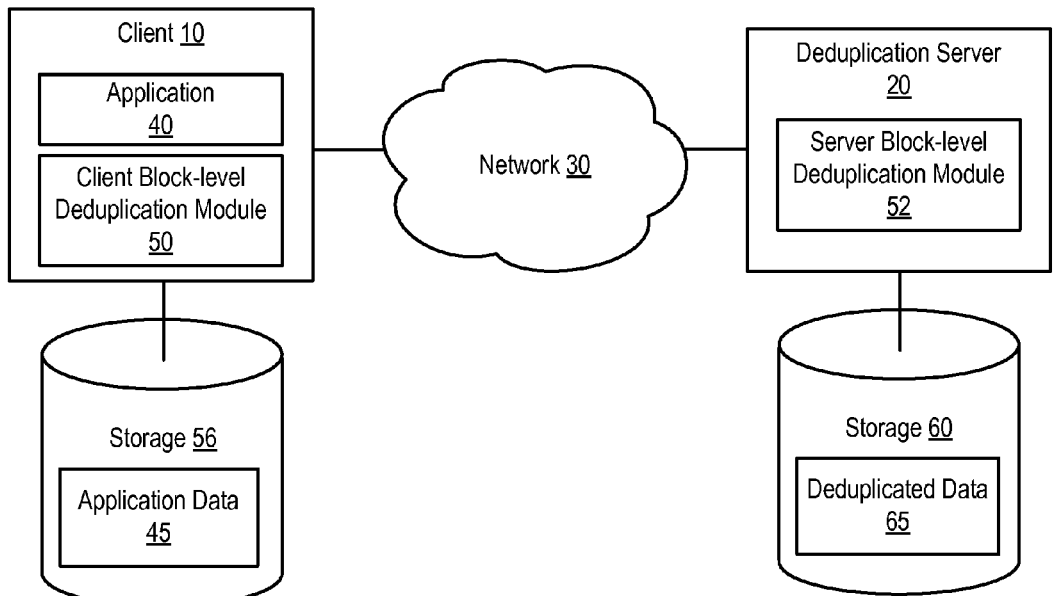
FIG. 1 is a block diagram of a system that performs block-level deduplication, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A client in a deduplication system is configured to support block-level deduplication in deduplication systems in which the deduplication server operates on "chunks" of data that includes multiple blocks. The client can communicate with the deduplication server in a manner in which only the changed blocks within a given chunk (as opposed to the entire chunk) need to be transferred to the deduplication server for storage. Similarly, the deduplication server can use block-level deduplication techniques to reduce the amount of storage space needed.

FIG. 1 is a block diagram of a computing system. As shown, the computing system includes a client 10 and a deduplication server 20, coupled by a network 30. Network 30 can include a WAN (Wide Area Network), such as the Internet, one or more LANs (Local Area Networks), and/or one or more SANs (Storage Area Networks).

Client 10 implements an application 40 (e.g., a word processing program, email program, graphic editing program, database application, or the like), which accesses (e.g., by generating and/or consuming) application data 45 on storage device 56. Client 10 is a computing device such as a personal computer, laptop computer, server, personal digital assistant, cell phone, or the like. Storage device 56 can be included within and/or coupled to (e.g., via a bus, network, or other appropriate interconnect) client 10.

Deduplication server 20 is another computing device that is configured to deduplicate data for storage in storage device 60. In general, client 10 (as well as one or more other clients, now shown) can send data (e.g., a copy of all or part of application data 45) for storage in storage device 60. Before storing the data, deduplication server 20 will perform data deduplication in order to avoid storing redundant copies of the same data in storage device 60. In some embodiments, deduplication server 20 is a backup server that is configured to perform file-level (e.g., in which data is backed up on a file-by-file basis) or volume-level (e.g., in which data is backed up at the volume level) backups to backup application data 45 for client 10 by creating a point-in-time copy of application data 45 on storage 60. Storage 60 can be included within and/or coupled to (e.g., via a bus, network such as a SAN, or other appropriate interconnect) deduplication server 20. The stored deduplicated data within storage 60 is referred to herein as a deduplicated data store.

Storage devices 56 and 60 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

As noted briefly above, deduplication server 20 deduplicates data stored in storage device 60 for access by one or more clients such as client 10. Data deduplication involves reducing the number of copies of the same data that are stored as part of deduplicated data 65. For example, data deduplication can be used to achieve single-instance storage, in which only a single copy of each unique unit of data is maintained on a storage system. Data deduplication can be performed by generating an identifier for each unit of data included in deduplicated data 65. When another copy of the same unit of data is processed for inclusion in deduplicated data 65, deduplication server 20 will detect that a copy of the unit of data is already included in deduplicated data 65 and will thus not store another copy of the item of data. Instead, deduplication server 20 will simply create a pointer to the existing copy of the unit of data and increase a reference count associated with the existing copy of the unit of data. Detection of whether a copy of the unit of data is already stored can involve calculating an identifier (e.g., a checksum or signature) for the unit of data and comparing that identifier to the identifiers of units of data already stored within the storage system.

Figure 2:
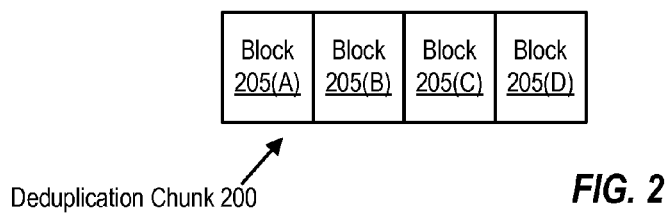
FIG. 2 is a block diagram illustrating an example of a discrepancy between the unit of data operated on by the deduplication server and the unit of data operated on by the client's file system.

The size of the unit of data used for data deduplication, which is referred to herein as a "chunk," can vary from the size of the unit of data used by other system components, such as file systems and/or volume managers. For example, a file system and/or volume manager can track data in terms of fixed-sized blocks. In contrast, the deduplication server can operate on chunks, each of which includes multiple blocks. An example of this discrepancy is illustrated in FIG. 2, which shows a deduplication chunk 200 that includes four blocks 205(A), 205(B), 205(C), and 205(D). Chunks can be fixed-size sets of multiple blocks. Alternatively, a chunk can be defined at the file level (e.g., each file, which can include multiple blocks, can be treated as a single chunk).

In conventional deduplication schemes, deduplication is performed at the chunk level only. In such a scheme, to perform an incremental deduplicated backup (in which only the chunks of data that have been modified subsequent to the most recent full or incremental backup is copied to the backup image), the deduplication system would determine which chunks had been modified (even if only partially) since the last backup, and those chunks would be sent, in their entirety, to the deduplication server. While this removes the need to send all chunks to the deduplication server when performing the incremental backup, inefficiencies can still arise in situations in which the deduplication chunk size is significantly larger than the block size and only one or two blocks within the chunk have been modified. In these situations, it is necessary to consume network bandwidth to transfer the entire chunk to the deduplication server, even though only a relatively small portion of the chunk has been modified.

To reduce this inefficiency, deduplication clients such as client 10 can include a client block-level deduplication module 50 configured to send only the changed blocks within deduplication chunks (as opposed to the entire deduplication chunks) to deduplication server. In order to allow a corresponding server block-level deduplication module 52 within the deduplication server to be able to properly interpret these changed portions, a client can send the deduplication server information identifying the size of each portion (e.g., in absolute terms or relative to the size of a deduplication chunk), as well as information identifying the location of each changed portion within the chunk.

Deduplication systems can perform source-side deduplication or target-side deduplication. In source-side deduplication, deduplication system clients such as client 10 maintain a full or partial cache of identifiers (e.g., signatures or fingerprints) of each chunk of data that the client (or, in some embodiments, one or more other clients) has provided to the deduplication server for storage within the deduplicated data storage device. Each time the client identifies a new chunk of data that should be copied to the deduplication server (e.g., if performing an incremental backup, the chunk can be identified due to that chunk of data having been modified subsequent to a prior backup), the client can calculate the identifier for that chunk of data (e.g., by calculating a checksum or hash of the chunk of data). The client can then identify whether the newly-calculated identifier matches any of the identifiers within the cache maintained by the client. If so, the client can determine that the chunk of data is already stored in the deduplicated data store and thus does not need to be transferred to the deduplication server.

In contrast, in target-side deduplication, the deduplication server calculates all of the identifiers. In these systems, chunks of data that might need to be added to the deduplication data store are always transferred to the deduplication server. Once the chunk of data is received by the deduplication server, the deduplication server can calculate the identifier for the chunk and determine whether a copy of that chunk has already been stored.

The techniques described herein for performing block level deduplication (where the block size is not the same as the deduplication chunk size) can be used in a variety of different deduplication systems, including systems that perform source-side deduplication and systems that perform target-side deduplication. In either type of system, these techniques can be used to reduce the amount of data that is transferred between the deduplication client and the deduplication server. Furthermore, in some cases, these techniques can be used to reduce the amount of data stored in the deduplicated data store (e.g., instead of having to store a new version of an entire chunk each time a block within that chunk is modified, the system can simply store the new version of the particular block that was modified).

In general, client 10 is configured to detect whether any blocks within a chunk (e.g., a file or fixed-size set of blocks) of data needs to be sent to the deduplication server 20, based upon whether the client is participating in a source- or target-side deduplication system. In a source-side deduplication system, the client will first detect whether there are any deduplication chunks that include modified blocks and then determine whether those chunks have already been sent to the deduplication server. In a target-side deduplication system, the client will simply detect whether there are any deduplication chunks that include modified blocks. If there are modified blocks that need to be transferred, client 10 generates information identifying the block size (e.g., in absolute terms or relative to the chunk size) and information identifying the location of the block within a deduplication chunk. Client 10 then sends this information and the associated blocks to deduplication server 20.

Figure 3:
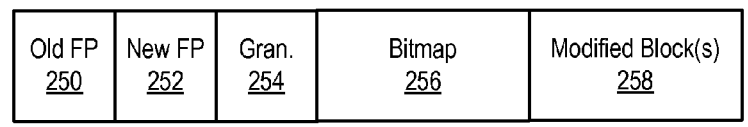
FIG. 3 is a block diagram of a packet structure usable to transfer data to a deduplication server, according to one embodiment of the present invention.

FIG. 3 illustrates an example of a packet format that can be used to send one or more modified portions (but fewer than all portions) within a given deduplication chunk to a deduplication server. In this example, each deduplication chunk is subdivided into several blocks (e.g., as shown in FIG. 2). In some embodiments, the packet can include the old ("Old FP" 250) and new ("New FP" 252) values of the fingerprint (or other identifier) used by the deduplication system to identify the deduplication chunk. The old fingerprint identifies the value of the deduplication chunk prior to the modification of one or more blocks within the chunk; the new fingerprint identifies the current, post-modification value of the deduplication chunk.

The packet then includes a granularity ("gran.") field 254. The value of this field indicates the granularity of the blocks within the deduplication chunk. This field can indicate, for example, that each block is 4 KB (Kilobytes) in size. Alternatively, this field can indicate the size in relative terms. For example, if the deduplication chunk size is 128 KB and the block size is 4 KB, the value of the granularity field can indicate that there are 32 blocks per deduplication chunk.

The next field, bitmap 256, identifies the location of the modified block(s) within the deduplication chunk. In this example, a bitmap is used. The bitmap includes one bit for each block within the deduplication chunk. For example, if there are 32 blocks per deduplication chunk, the bitmap will include 32 bits. Each bit corresponds to a particular block, as ordered within the deduplication chunk. For example, a bitmap representing deduplication chunk 200 of FIG. 2 can include four bits. The first bit can correspond to block 205(A), the second bit can correspond to block 205(B), the third bit can correspond to block 205(C), and the fourth bit can correspond to block 205(D). If only block 205(C) needed to be sent to the deduplication server, the bitmap could have the value 0010, where a zero indicates that the corresponding block is not included in the packet and a one indicates that the corresponding block is included in the packet.

The packet can then include the modified block(s) 258 that are being transferred to the deduplication server. In some embodiments, all or part of this information can be transferred in one or more separate packets, instead of being entirely included within the same packet as the metadata describing the deduplication chunk.

Returning to FIG. 1, in response to receiving a packet like that shown in FIG. 3, the deduplication server 20 can, if needed, appropriately store the modified block(s) within storage device 60. If the system is performing source-side deduplication, the client has already determined that the modified deduplication chunk is not yet stored in the deduplicated data store. The deduplication server 20 can confirm this determination and, if confirmed, update the deduplicated data store. If the client's determination is incorrect (e.g., if the new version of the deduplication chunk was already added to the deduplicated data store by another client), the deduplication server can simply confirm the client's request without taking further action.

If the system is performing target-side deduplication, the deduplication server 20 can calculate the fingerprint or other identifier for the modified chunk (if not already provided by the client). This can involve reading the modified blocks within the chunk from the packet provided by the client and reading the unmodified blocks within the chunk from the deduplicated data store, and then performing the appropriate calculation on the reconstituted chunk. The deduplication server 20 can then determine whether a chunk identified by that fingerprint has already been added to the deduplicated data store. If not, the deduplication server 20 will update the deduplicated data store.

The deduplication server 20 can update the deduplicated data store in a variety of ways. For example, in systems where the deduplicated data store is storing multiple point-in-time copies of application data 45, such as backups, the deduplication server can store a new version of the deduplication chunk in addition to the old version of the deduplication chunk. Alternatively, the deduplication server 20 can store only the modified portions of the new version of the deduplication chunk, as well as a reference (e.g., in the form of a pointer or other identifier) to the earlier version of the deduplication chunk. In systems where only the most recent version is maintained in the deduplicated data store, the deduplication server 20 can replace the old value of the deduplication chunk with the new value (this may depend on whether there are multiple references to the old value of the deduplication chunk, indicating that the chunk has been stored by clients other than the client that provided the packet to the deduplication server).

In embodiments in which deduplication server 20 only stores the modified portions of the new version of the deduplication chunk, the deduplication server 20 can be configured to limit the number of references allowed to earlier versions. For example, the original version can be created at T1 and sent in its entirety to the deduplication server for inclusion in the deduplicated data store. At T2, this version can be modified, and the client can send the modified portions of the new version of the deduplication chunk to the deduplication server for addition to the deduplicated data store. The deduplication server adds the modified portions of the new version of the deduplication chunk, as well as an associated reference to the earlier version created at T1. At T3, the deduplication chunk is modified again, and the client again sends the modified portions of the deduplication chunk to the deduplication server. Here, if the allowable number of references is greater than one, the deduplication server can again only add the modified portions received from the client to the deduplicated data store, as well as a corresponding reference to the version created at T2, which, as noted above, itself includes a reference to the version created at T1. If the allowable number of references is not greater than one, the deduplication server will instead store the version of the deduplication chunk created at T2 in its entirety (e.g., by combining the blocks received from the client with blocks stored in the deduplicated data store in versions T2 and/or T1, as appropriate). This version will not need to refer to any other version. The maximum number of references can be configured by an administrator or preconfigured as part of the deduplication system.

As yet another alternative, instead of storing only the modified blocks along with a reference to an earlier version, the deduplication server 20 can instead relocate a portion of the earlier version and then replace those relocated blocks with the modified blocks just received from the client. This can be performed in a manner similar to that used to create copy on write (COW) snapshots.

Figure 4A:
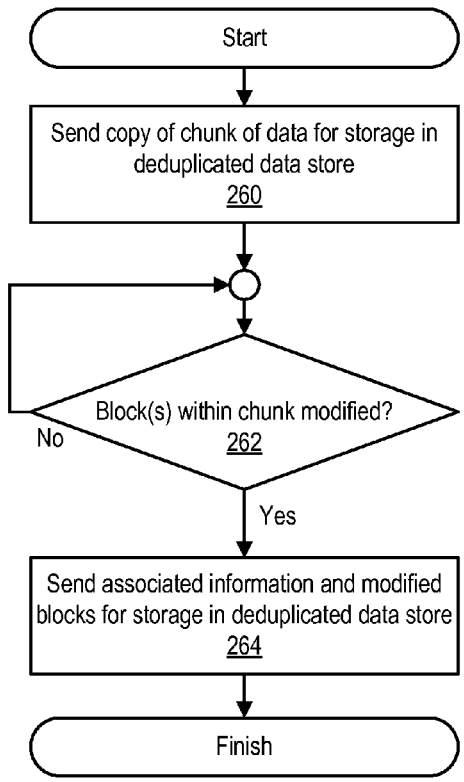
FIGS. 4A and 4B are flowcharts of client- and server-side techniques for performing block-level deduplication, according to one embodiment of the present invention.

FIG. 4A is a flowchart of a technique a deduplication client can use to perform block-level deduplication. This method can be performed by a deduplication client that implements a block-level deduplication module, such as client block-level deduplication module 50 of FIG. 1. In some embodiments, the deduplication client is a backup client, and this method can be performed in response to a request to create an incremental or full backup subsequent to the creation of an initial full backup.

The method begins at 260, when the client sends a copy of a chunk of data to a deduplication server for inclusion in a deduplicated data store. The client and server can implement either source-side or target-side deduplication. The client and server can be implemented within the same computing device or within different computing devices than each other. In the latter situation, the client and server can communicate via a network.

At 262, the client detects that the chunk of data initially preserved at 260 has subsequently been modified. In particular, at least one but fewer than all of the blocks included within the chunk of data have been modified.

In order to preserve this new version of the chunk of data, the client sends the modified blocks (but not the entire chunk), as well as associated information, to the deduplication server for inclusion in the deduplicated data store, as shown at 264. The associated information includes information usable to locate the modified blocks within the chunk of data. The associated information can also include fingerprints or other identifiers of the old and new versions of the chunk of data and/or granularity information indicating size of each block.

Figure 4B:
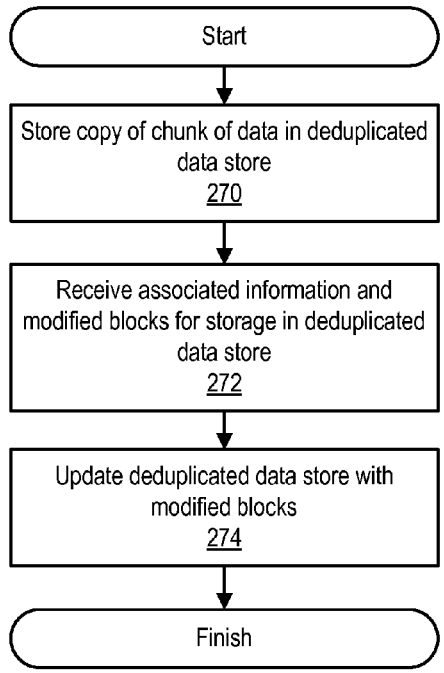

FIG. 4B is a flowchart of a technique a deduplication server can use to perform block-level deduplication. This method can be performed by a deduplication server that implements a block-level deduplication module, such as server block-level deduplication module 52 of FIG. 1. This method can be performed in order to create a backup image to store an incremental or full backup created subsequent to the creation of an initial full backup image.

This method begins at 270, when the server stores a first version of a chunk of data in a deduplicated data store. Subsequently, the server receives a packet from a deduplication client that indicates that a new version of the chunk of data has been created. The packet includes the portions of the chunk of data that were modified to create the second version, as indicated at 272. The packet also includes associated information that identifies the location of each modified block within the chunk of data.

In response to receiving the packet, the server updates the deduplicated data store to include the modified blocks, as indicated at 274. Performing operation 274 can involve reading at least part of the first version of the chunk from the deduplicated data store and combining that part with the modified blocks to reconstitute the new version of the chunk of data. The new version can be stored in its entirety within the deduplicated data store. Alternatively, the modified blocks (or the original value of the modified blocks) can be stored separately, with a reference to the first version of the chunk.

Figure 5:
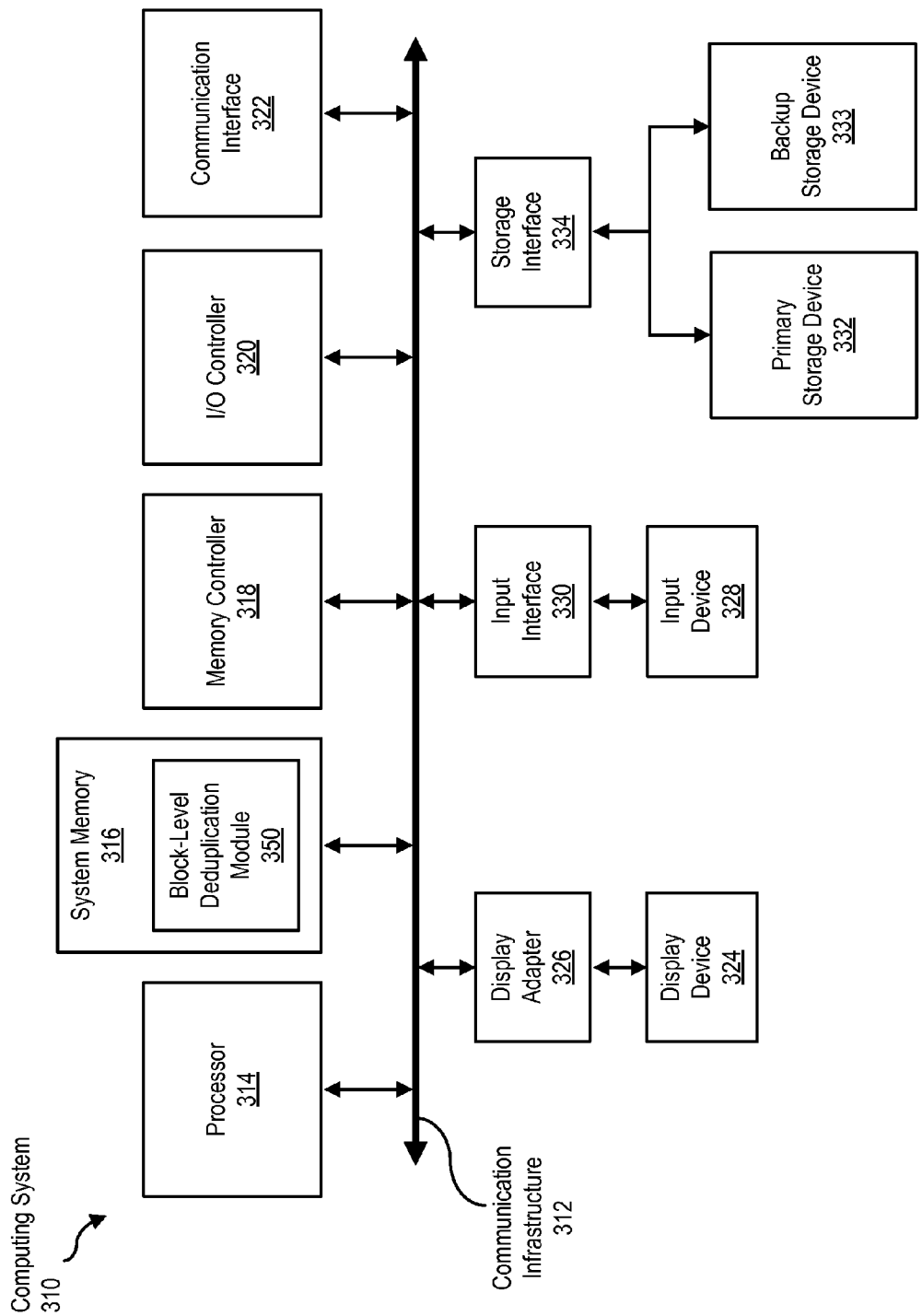
FIG. 5 is a block diagram of a computing device, illustrating how a block-level deduplication module can be implemented in software, according to one embodiment of the present invention.

FIG. 5 is a block diagram of a computing system 310 capable of implementing block-level deduplication as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements a client or server block-level deduplication module, computing system 310 becomes a special purpose computing device that is configured to perform block-level deduplication.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, primary storage device 332, as described in detail below). In one example, program instructions executable to implement a block-level deduplication module 350 (e.g., a client module 50 or server module 52 as shown in FIG. 1) may be loaded into system memory 316.

In certain embodiments, computing system 310 may also include one or more components or elements in addition to processor 314 and system memory 316. For example, as illustrated in FIG. 5, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 5, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 5, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 5, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can store information such as backup images and/or a backup catalog.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 5 need not be present to practice the embodiments described and/or illustrated herein. The devices and subsystems referenced above may also be interconnected in different ways from that shown in FIG. 5.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 6:
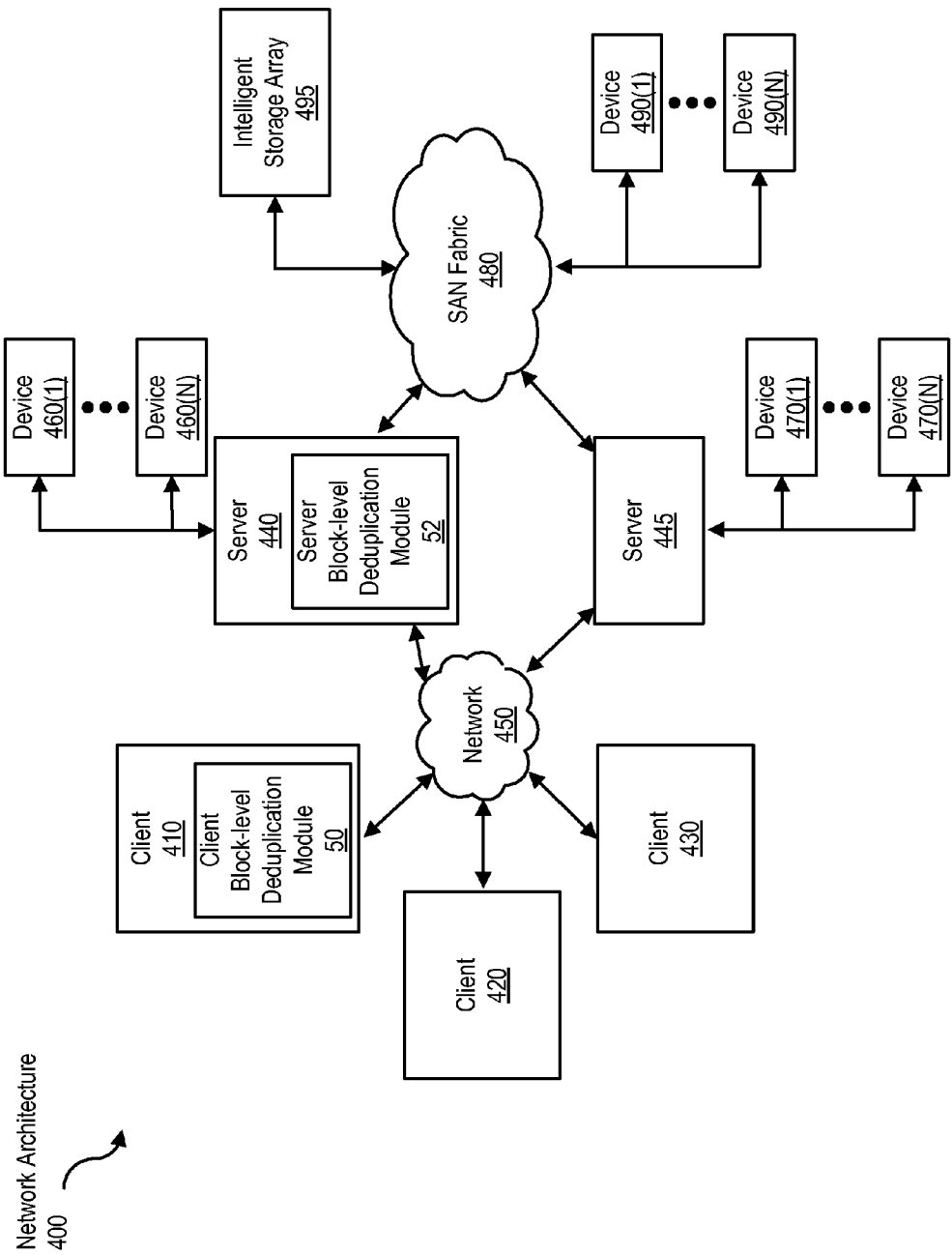
FIG. 6 is a block diagram of a networked system, illustrating how various computing devices can communicate via a network, according to one embodiment of the present invention.

FIG. 6 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 5.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 and/or servers 440 and/or 445 may include a client block-level deduplication module 50 as shown in FIG. 1. Similarly, one or more of servers 440 and 445 may include a server block-level deduplication module 52 as shown in FIG. 1.

As illustrated in FIG. 6, one or more storage devices 440(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 440(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS). Such storage devices can store backup images and/or backup catalogs, as described above.

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 5, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440(1)-(N), storage devices 470(1)-(N), storage devices 490(1)-(N), or intelligent storage array 495. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a block-level deduplication module may transform the behavior of a deduplication system such that less than all of the data within a deduplication chunk needs to be transferred between deduplication clients and servers.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 replicating a chunk of data, the replicating comprising
  sending the chunk of data to a deduplication server for storage in a deduplicated data store, wherein
   the chunk of data comprises a plurality of blocks, and
   the chunk of data is identified within the deduplicated data store by a single fingerprint;
 subsequent to the sending, determining whether at least one of the plurality of blocks has been modified, thereby creating a modified chunk of data; and
 in response to a determination that at least one of the plurality of blocks has been modified, incrementally replicating the modified chunk of data to the deduplicated data store by sending the at least one of the plurality of blocks but fewer than all of the plurality of blocks of the modified chunk of data to the deduplication server, wherein
the sending is performed by a computing device implementing a deduplication client, and
the deduplication server performs deduplication on chunk-sized units of data by comparing the chunk of data identified with the modified chunk of data incrementally replicated to the deduplication data store, wherein
the chunk of data is identified based on the single fingerprint.

2. The method of claim 1, wherein
the sending the chunk of data comprises sending the chunk of data via a network.

3. The method of claim 1, wherein
the associated information comprises an identifier of a first version of the chunk of data and an identifier of a second version of the chunk of data,
the sending the chunk of data comprises sending the first version, and
the second version is created subsequent to the sending the chunk of data and in response to the at least one of the plurality of blocks being modified.

4. The method of claim 3, wherein
the sending the associated information is performed in response to detecting that the second version of the chunk of data is not yet included in the deduplicated data store.

5. The method of claim 1, wherein
the deduplication comprises storing only the blocks comprising the modified chunk of data with the reference associated with the chunk.

6. The method of claim 1, further comprising:
calculating the single fingerprint for the chunk of data, wherein
the single fingerprint identifies a value of the chunk of data prior to the modification of the at least one of the plurality of blocks, and
the single fingerprint is not derived from a fingerprint of each block of the plurality of blocks.

7. The method of claim 1, further comprising:
accessing at least part of a previous version of the chunk of data in the deduplicated data store;
combining at least the part of the previous version of the chunk of data with the at least one of the plurality of blocks to reconstitute a new version of the chunk of data; and
storing the new version of the chunk of data in the deduplicated data store.

8. A non-transitory computer readable storage medium storing program instructions executable to:
replicate a chunk of data, the replicating comprising
sending the chunk of data to a deduplication server for storage in a deduplicated data store, wherein
the chunk of data comprises a plurality of blocks, and
the chunk is identified within the deduplicated data store by a single fingerprint;
subsequent to sending the chunk of data, determine whether at least one of the plurality of blocks has been modified, thereby creating a modified chunk of data; and
in response to a determination that at least one of the blocks has been modified,
incrementally replicate the modified chunk of data to the deduplicated data store by sending the at least one of the plurality of blocks but fewer than all of the plurality of blocks of the modified chunk of data to the deduplication server, wherein
the sending is performed by a computing device implementing a deduplication client, and
the deduplication server performs deduplication on chunk-sized units of data by comparing the chunk of data identified with the modified chunk of data incrementally replicated to the deduplication data store, wherein
the chunk of data is identified based on the single fingerprint.

9. The non-transitory computer readable storage medium of claim 8, wherein
the sending the chunk of data comprises sending the chunk of data via a network.

10. The non-transitory computer readable storage medium of claim 8, wherein
the associated information comprises an identifier of a first version of the chunk of a data and an identifier of a second version of the chunk of data,
sending the chunk of data comprises sending the first version, and
the second version is created subsequent to sending the chunk of data and in response to the at least one of the plurality of blocks being modified.

11. The non-transitory computer readable storage medium of claim 10, wherein
associated information and the at least one of the plurality of blocks is sent in response to detecting that the second version of the chunk of data is not yet included in the deduplicated data store.

12. A system comprising:
one or more processors; and
a memory coupled to the one or more processors, wherein the memory stores program instructions executable by the one or more processors to:
replicate a chunk of data, the replicating comprising
sending the chunk of data to a deduplication server for storage in a deduplicated data store, wherein
the chunk of data comprises a plurality of blocks, and
the chunk of data is identified within the deduplicated data store by a single fingerprint;
subsequent to sending the chunk of data, determine whether at least one of the plurality of blocks has been modified, thereby creating a modified chunk of data; and
in response to determining that at least one of the blocks has been modified, incrementally replicate the modified chunk of data to the deduplicated data store by sending the at least one of the plurality of blocks but fewer than all of the plurality of blocks of the modified chunk of data to the deduplication server, wherein
the sending is performed by a computing device implementing a deduplication client, and
the deduplication server performs deduplication on chunk-sized units of data by comparing the chunk of data identified with the modified chunk of data incrementally replicated to the deduplication data store, wherein
the chunk of data is identified based on the single fingerprint.

13. The system of claim 12, wherein
the sending the chunk of data comprises sending the chunk of data via a network.

14. The system of claim 12, wherein
the associated information comprises an identifier of a first version of the chunk of a data and an identifier of a second version of the chunk of data,
sending the chunk of data comprises sending the first version, and
the second version is created subsequent to sending the chunk of data and in response to the at least one of the plurality of blocks being modified.

15. The system of claim 14, wherein
associated information and the at least one of the plurality of blocks is sent is performed in response to detecting that the second version of the chunk of data is not yet included in the deduplicated data store.

* * * * *